US009409792B2

(12) United States Patent
Zhang et al.

(10) Patent No.: US 9,409,792 B2
(45) Date of Patent: Aug. 9, 2016

(54) SOLVENTHERMAL SYNTHESIS OF NANOSIZED TWO DIMENSIONAL MATERIALS

(71) Applicant: Toyota Motor Engineering & Manufacturing North America, Inc., Erlanger, KY (US)

(72) Inventors: Ruigang Zhang, Ann Arbor, MI (US); Chen Ling, Ann Arbor, MI (US); Hongfei Jia, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/526,929

(22) Filed: Oct. 29, 2014

(65) Prior Publication Data
US 2016/0122198 A1 May 5, 2016

(51) Int. Cl.
*C01G 39/06* (2006.01)

(52) U.S. Cl.
CPC ............. *C01G 39/06* (2013.01); *C01P 2002/08* (2013.01); *C01P 2004/04* (2013.01); *C01P 2004/24* (2013.01)

(58) Field of Classification Search
CPC . C01G 39/06; C01P 2002/08; C01P 2004/24; C01P 2004/04
See application file for complete search history.

(56) References Cited

U.S. PATENT DOCUMENTS

| 3,933,688 A | 1/1976 | Dines |
| 4,822,590 A * | 4/1989 | Morrison et al. .......... 423/561.1 |
| 2008/0206124 A1* | 8/2008 | Jang et al. .................. 423/415.1 |

FOREIGN PATENT DOCUMENTS

CN 103937329 A 7/2014

OTHER PUBLICATIONS

M. Stanley Whittingham and Jacobson, Allan J. Materials Science Series: Intercalation Chemistry. 1982. Academic Press, Inc. 539-542.*
Sujay Prabakar et al., "Liquid-Phase Synthesis of Flower-like and Flake-like Titanium Disulfide Nanostructures", Chem. Mater., 2009, vol. 21, pp. 1725-1730.
Manish Chhowalla et al., "The chemistry of two-dimensional layered transition metal dichalcogenide nanosheets", Nature Chemistry, 2013, vol. 5, pp. 263-275.
Anupama B. Kaul, "Two-dimensional layered materials: Structure, properties, and prospects for device applications", J. Mater. Res., vol. 29, No. 3, Feb. 14, 2014, pp. 348-361.
Wang, Shutao, et al, Synthetic Fabrication of Nanoscale MoS2-Based Transition Metal Sulfides, Materials, 2010, 401-433, vol. 3.
(Continued)

*Primary Examiner* — Michelle Mandala
(74) *Attorney, Agent, or Firm* — Dinsmore & Shohl LLP

(57) ABSTRACT

A process of forming two dimensional nano-materials that includes the steps of: providing a bulk two dimensional material; providing lithium iodide; suspending the lithium iodide and bulk two dimensional material in a solvent forming a solution; initiating a solvent thermal reaction forming a lithiated bulk two dimensional material. The resulting lithiated bulk two dimensional material may be exfoliated after the solvent thermal reaction forming a two dimensional layered material.

18 Claims, 6 Drawing Sheets

(56) References Cited

OTHER PUBLICATIONS

Goloveshkin, Alexander S., et al, Structural Properties and Phase Transition of Exfoliated-Restacked Molybdenum Disulfide, The Journal of Physical Chemestry, Mar. 26, 2013, American Chemichal Society.

Benevente, E., et al, Intercalation Chemistry of Molybdenum Disulfide, Coordination Chemestry Reviews, 2002, vol. 224, pp. 87-109.

* cited by examiner

SOLVENTHERMAL SYNTHESIS OF NANOSIZED TWO DIMENSIONAL MATERIALS

FIELD OF THE INVENTION

The invention relates to a process for forming nanosized two dimensional materials and the materials produced by the process.

BACKGROUND OF THE INVENTION

Two-dimensional (2D) materials have attracted great attention in the past decade. Although grapheme is by far the most intensively studied 2D material, considerable interest has focused on transition metal dichalcogenides, especially molybdenum disulfide, because of many potential applications, including as catalysts, energy storage materials, electrode materials and in electronic devices. However, one of the biggest challenges with the prior art is how to efficiently prepare 2D materials in large amounts with a safe and environmentally method.

It is known in the art that chemical Li intercalation with n-butyllithium (n-Bu-Li) can exfoliate layered compounds and produce 2D nanosheets. However, the use of this material requires a time consuming procedure. Further, n-Bu-Li is a dangerous chemical which is very sensitive to ambient conditions and is pyrophoric.

There is therefore a need in the art for an improved process of forming 2D materials such as nano-sheets or nano-sized materials that does not utilize pyrophoric materials in the process. There is a further need in the art for a process that is not time consuming and may produce large quantities of materials in an environmentally safe manner.

SUMMARY OF THE INVENTION

In one aspect there is disclosed a process of forming two dimensional nano-materials that includes the steps of: providing a bulk two dimensional material; providing lithium iodide; suspending the lithium iodide and bulk two dimensional material in a solvent forming a solution; and initiating a solvent thermal reaction forming a lithiated bulk two dimensional material.

In another aspect there is disclosed a process of forming two dimensional nano-materials that includes the steps of: providing a bulk two dimensional material; providing lithium iodide; suspending the lithium iodide and bulk two dimensional material in a solvent forming a solution; initiating a solvent thermal reaction forming a lithiated bulk two dimensional material; and exfoliating the lithiated bulk two dimensional material after the solvent thermal reaction forming a two dimensional layered material.

In a further aspect there is disclosed a process of forming two dimensional nano-materials that includes the steps of: providing a bulk two dimensional material; providing lithium iodide; suspending the lithium iodide and bulk two dimensional material in a solvent forming a solution; initiating a solvent thermal reaction and reacting at a temperature of from 150 to 250 degrees ° C. forming a lithiated bulk two dimensional material; and exfoliating the lithiated bulk two dimensional material after the solvent thermal reaction forming a two dimensional layered material.

DETAILED DESCRIPTION OF THE PREFERRED EMBODIMENTS

Figure 1:
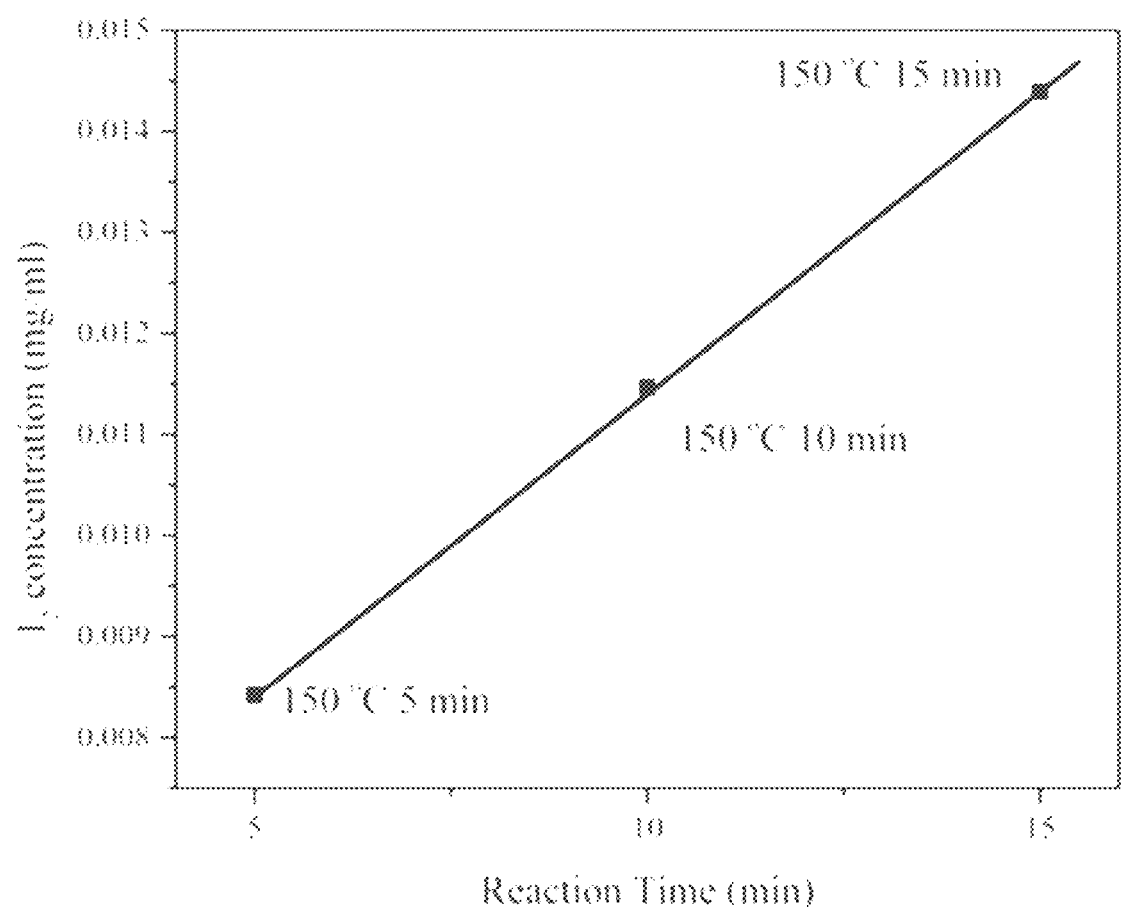
FIG. 1 is a plot of the iodine concentration as a function of reaction time.

Two-dimensional (2D) materials such as transition metal dichalcogenides including molybdenum disulfide ($MoS_2$) may be utilized in many applications such as catalysts, energy storage materials, electrode materials and in electronic devices. Processes for forming such materials often require the use of volatile materials that require complicated reaction mechanisms and require a long reaction time. One such material utilized in the prior art for the formation of two-dimensional (2D) materials includes n-Bu-Li which is very sensitive to ambient conditions and is pyrophoric.

Lithium iodide (LiI) is very stable in air and is not pyrophoric. However the Li intercalation reaction using LiI is too slow to be detected at room temperature. In order to accelerate the reaction between LiI and a 2D bulk material, such as $MoS_2$, a high temperature solvent thermal reaction may be utilized. The solvent thermal reaction may be a microwave assisted solvent thermal reaction. The reaction can be described as below:

$$2LiI + MoS_2 \rightarrow 2LiMoS_2 + I_2$$

The process can be monitored by measuring the concentration of $I_2$ in a solvent such as hexane.

In one aspect there is disclosed a process of forming two dimensional nano-materials that includes the steps of: providing a bulk two dimensional material; providing lithium iodide; suspending the lithium iodide and bulk two dimensional material in a solvent forming a solution; and initiating a solvent thermal reaction forming a lithiated bulk two dimensional material.

The bulk 2D material may include transition metal dichalcogenides including molybdenum disulfide ($MoS_2$). Various solvents may be utilized in the process including hexane.

In one aspect, the solvent thermal reaction may be a microwave assisted process where the solution is exposed to a source of microwave energy for a specified period of time to raise the temperature of the solution to a desired temperature range. In one aspect, the solution may be exposed to microwave energy from 5 to 20 minutes. The temperature may be elevated to a temperature of from 150 to 250 degrees C. In one aspect, the reaction temperature may be around 200 degrees C. The lithiated bulk two dimensional material may be cooled and filtered following the solvent thermal reaction.

Following lithiation, the process may include exfoliating the lithiated bulk two dimensional material. The exfoliation step may include immersing the lithiated bulk two dimensional material in hot water wherein lithium reacts with the water forming lithium hydroxide and hydrogen gas forming an 2D nano-material, such as a 2D nano-sheet. The process may further include the step of centrifuging the exfoliated lithiated two dimensional material to separate the material from the water.

Examples $MoS_2$ nano-sheets were prepared according to the following procedure. 15 ml of anhydrous hexane was placed in a 30-ml quartz tube. 0.1 g $MoS_2$ and 0.166 G LiI were suspended in the hexane. The solution was placed in an Anton Paar microwave reactor and the solution was subjected to a solvent thermal reaction at various conditions as detailed in the Table below.

|        | 150° C. | 175° C. | 200° C. | 225° C. |
|--------|---------|---------|---------|---------|
| 5 min  | test 1  | test 2  | test 3  | test 4  |
| 10 min | test 5  | test 6  | test 7  | test 8  |
| 15 min | test 9  | test 10 | test 11 | test 12 |
| 20 min | test 13 | test 14 | test 15 | test 16 |

After reaction, the mixture of lithiated $MoS_2$ and residue LiI were recovered by filtration. The reaction between $MoS_2$ and LiI was monitored by determining the concentration of $I_2$ in Hexane through UV-Vis spectrum analysis. The lithiated $MoS_2$ was immersed in hot water to exfoliate the lithiated $MoS_2$ and remove LiI impurity. The exfoliated $MoS_2$ was recovered by centrifugation, Referring to FIG. 1, there is shown a plot detailing the lithiation reaction at different conditions showing the $I_2$ concentration as the function of reaction time. The $I_2$ concentration was measured by UV-Visible spectroscopy. As can be seen in FIG. 1, increasing the reaction time results in a higher $I_2$ concentration indicating a greater lithiation of the bulk 2D material.

Figure 2:
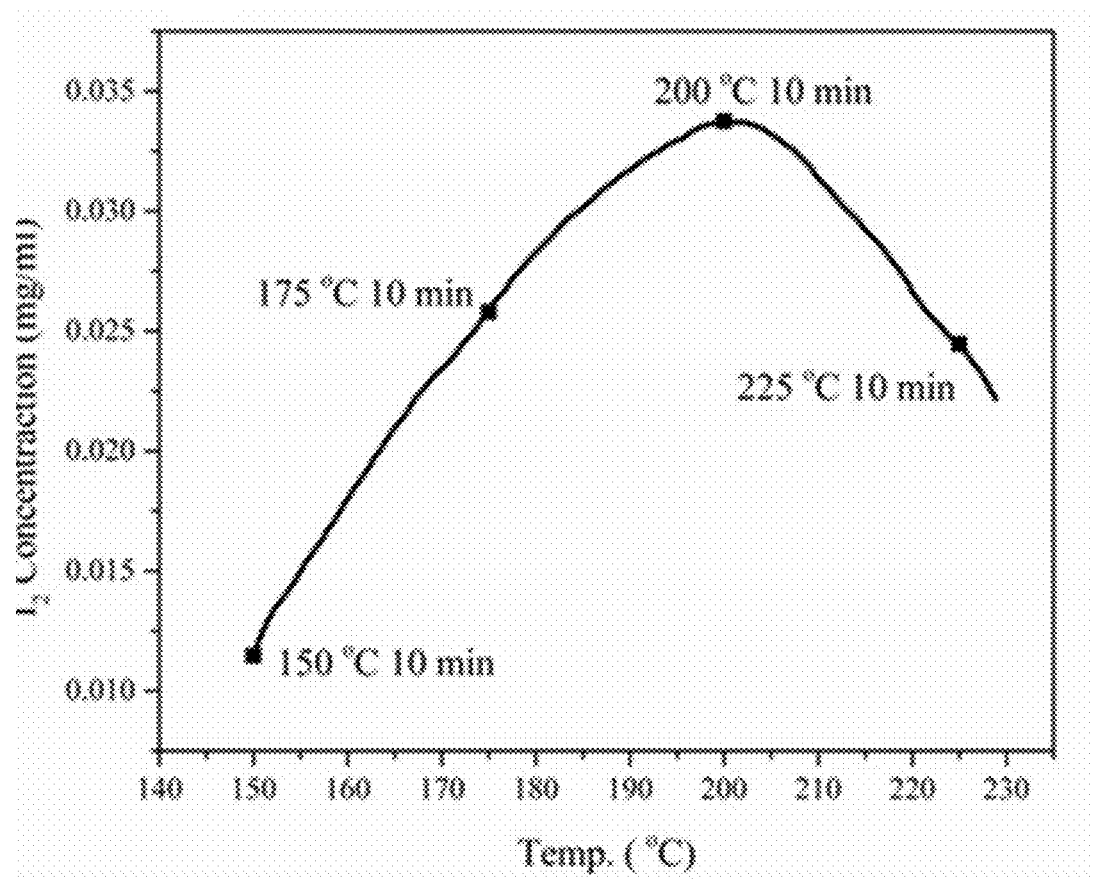
FIG. 2 is a plot of the iodine concentration as a function of reaction temperature.

Referring to FIG. 2, there is shown a plot detailing the lithiation reaction at different conditions showing the $I_2$ concentration as the function of reaction temperature. The $I_2$ concentration was measured by UV-Visible spectroscopy. As can be seen in FIG. 2, a reaction temperature in the range of 175 to 225 and around 200 degrees C. resulted in a higher $I_2$ concentration indicating a greater lithiation of the bulk 2D material.

As stated above, the lithiated $MoS_2$ was exfoliated in hot water. The liquid exfoliation mechanism includes lithiated $MoS_2$ that contains metallic Li which can react with water to form LiOH and produce $H_2$ gas. In the testing, bubbles were observed. The generated $H_2$ gas pushes the layers further apart.

Figure 3A:
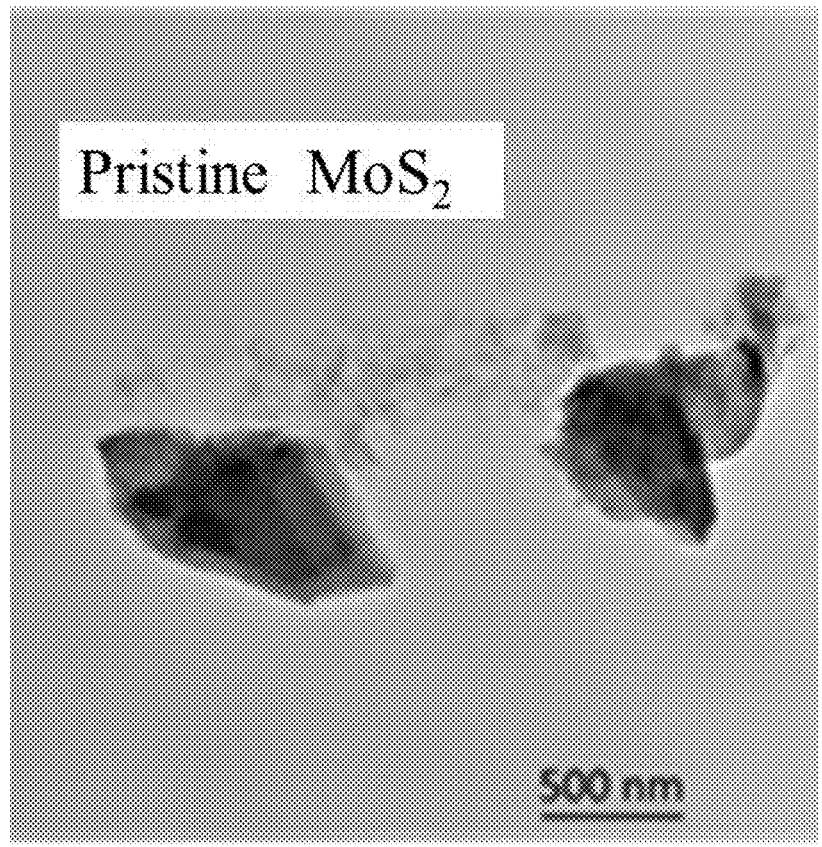
FIG. 3A is a TEM image of pristine $MoS_2$.
Figure 3B:
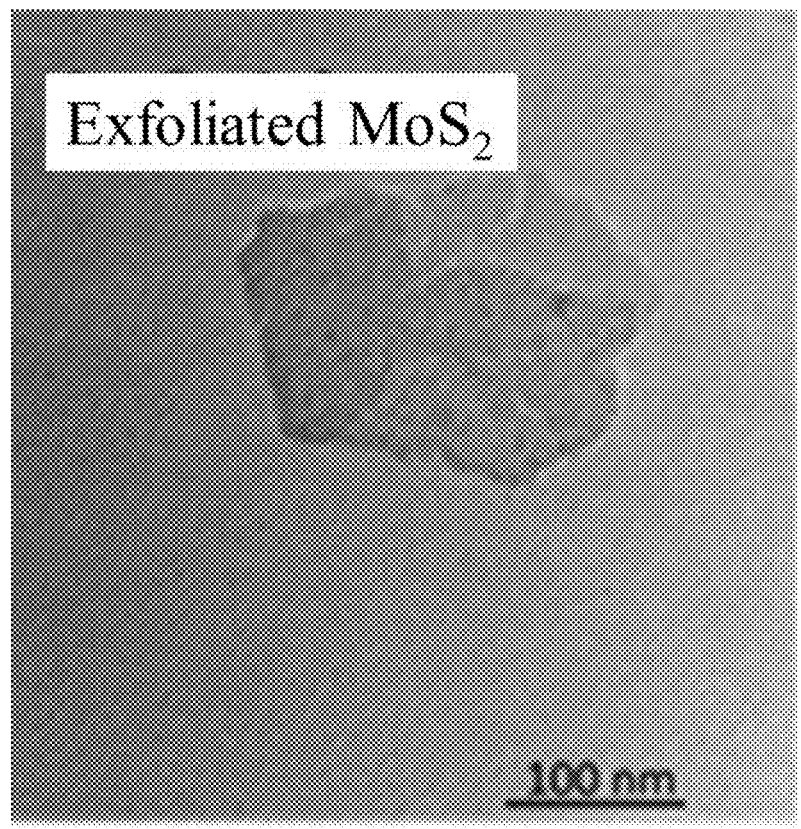
FIG. 3B is a TEM image of $MoS_2$ produced by the process as described in the specification after exfoliation.
Figure 4:
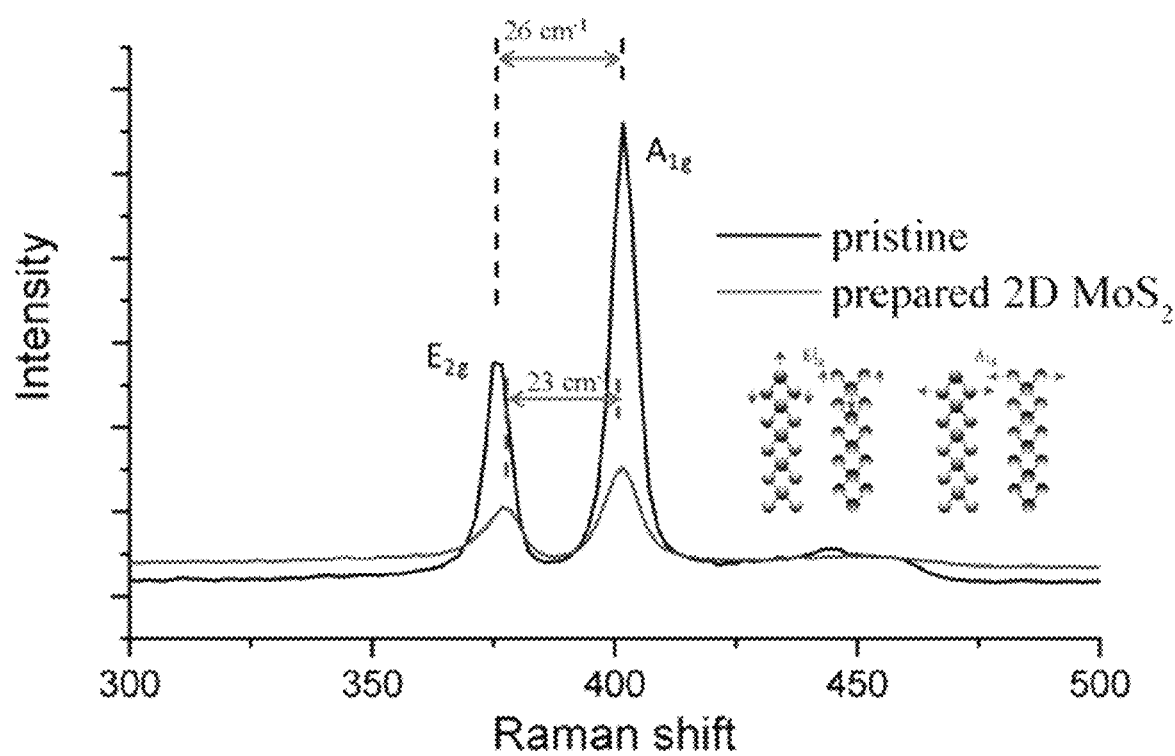
FIG. 4 is a Raman spectra of $MoS_2$ after exfoliation and pristine $MoS_2$ after exfoliation.

Referring to FIGS. 3A and B there are shown TEM images of the pristine material and a lithiated and exfoliated material, respectively. After exfoliation, nano-sized layered $MoS_2$ sheets were obtained.

Figure 5:
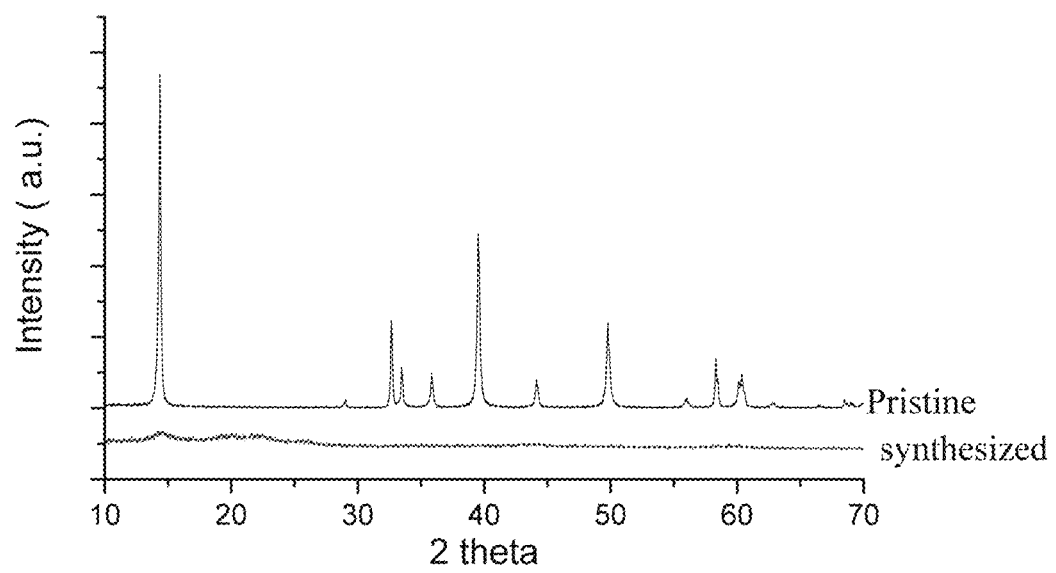
FIG. 5 is the XRD patterns of bulk $MoS_2$ and exfoliated $MoS_2$.

The Raman frequencies of in-plane $E_{2g}$ and out-of plane $A_{1g}$ modes can be used as reliable and convenient features to identify the number of layers in atomically thin $MoS_2$ nano-sheets. The obtained monolayer and few-layer $MoS_2$ nano-sheets at 0 (bulk) and exfoliated were characterized using Raman spectroscopy, as shown in FIG. 5. The spectra of the pristine material show two peaks around 382 (E1 2g mode) and 407 $cm^{-1}$ (A1g mode). The two modes in the exfoliated sample moved to 384 and 406 cm-1, respectively. The distance between the two modes exhibit a well-defined dependence on the number of layers. The average thickness of the $MoS_2$ nano-sheets was about 3 layers.

Referring to FIG. 5, there are shown the XRD patterns of bulk and exfoliated $MoS_2$. The peak intensity of exfoliated $MoS_2$ significantly decreased, indicating the particle size of exfoliated $MoS_2$ has been decreased.

The invention is not restricted to the illustrative examples described above. Examples described are not intended to limit the scope of the invention. Changes therein, other combinations of elements, and other uses will occur to those skilled in the art. The scope of the invention is defined by the scope of the claims.

Having described our invention, we claim:

1. A process of forming two dimensional nano-materials comprising the steps of:
   providing a bulk two dimensional material of molybdenum disulfide;
   providing lithium iodide;
   suspending the lithium iodide and bulk two dimensional material in a solvent forming a solution;
   initiating a solvent thermal reaction forming a lithiated bulk two dimensional material.

2. The process of claim 1 including the step exposing the solution to a source of microwave energy initiating the solvent thermal reaction.

3. The process of claim 1 wherein the solvent is anhydrous hexane.

4. The process of claim 2 wherein the exposing step is from 5 to 20 minutes.

5. The process of claim 1 wherein the solvent thermal reaction includes elevating the solution to a temperature of from 150 to 250 degrees C.

6. The process of claim 1 including the step of cooling and filtering the lithiated bulk two dimensional material following the solvent thermal reaction.

7. The process of claim 1 further including the step of exfoliating the lithiated bulk two dimensional material after the solvent thermal reaction forming a two dimensional layered material.

8. The process of claim 7 wherein the step of exfoliating the lithiated bulk two dimensional material includes immersing the lithiated bulk two dimensional material in hot water wherein lithium reacts with the water forming lithium hydroxide and hydrogen gas.

9. The process of claim 7 further including the step of centrifuging the exfoliated lithiated bulk two dimensional material.

10. A process of forming two dimensional nano-materials comprising the steps of:
    providing a bulk two dimensional material of molybdenum disulfide;
    providing lithium iodide;
    suspending the lithium iodide and bulk two dimensional material in a solvent forming a solution;
    initiating a solvent thermal reaction forming a lithiated bulk two dimensional material;
    exfoliating the lithiated bulk two dimensional material after the solvent thermal reaction forming a two dimensional layered material.

11. The process of claim 10 including the step exposing the solution to a source of microwave energy initiating the solvent thermal reaction.

12. The process of claim 10 wherein the solvent is anhydrous hexane.

13. The process of claim 11 wherein the exposing step is from 5 to 20 minutes.

14. The process of claim 10 wherein the solvent thermal reaction includes elevating the solution to a temperature of from 150 to 250 degrees C.

15. The process of claim 10 including the step of cooling and filtering the lithiated bulk two dimensional material following the solvent thermal reaction.

16. The process of claim 10 wherein the step of exfoliating the lithiated bulk two dimensional material includes immersing the lithiated bulk two dimensional material in hot water wherein lithium reacts with the water forming lithium hydroxide and hydrogen gas.

17. The process of claim 10 further including the step of centrifuging the exfoliated lithiated bulk two dimensional material.

18. A process of forming two dimensional nano-materials comprising the steps of:
   providing a bulk two dimensional material of molybdenum disulfide;
   providing lithium iodide;
   suspending the lithium iodide and bulk two dimensional material in a solvent forming a solution;
   initiating a solvent thermal reaction and reacting at a temperature of from 150 to 250 degrees C. forming a lithiated bulk two dimensional material;
   exfoliating the lithiated bulk two dimensional material after the solvent thermal reaction forming a two dimensional layered material.

* * * * *